March 25, 1969 R. W. KRUG 3,435,131

AUTOMATIC CHROMINANCE CONTROL SYSTEM

Filed Dec. 1, 1965 Sheet 1 of 2

INVENTOR.
Robert W. Krug
BY John J. Pederson
Attorney

INVENTOR.
Robert W. Krug
BY
Attorney 3,435,131

AUTOMATIC CHROMINANCE CONTROL SYSTEM

Robert W. Krug, Oak Park, Ill., assignor to Zenith Radio Corporation, Chicago, Ill., a corporation of Delaware Filed Dec. 1, 1965, Ser. No. 510,805
Int. Cl. H04n 9/48, 5/38, 5/44
U.S. Cl. 178—5.4 9 Claims

ABSTRACT OF THE DISCLOSURE

A color-killer circuit in the chrominance channel of a color television receiver which utilizes the ACC-controlled first chrominance amplifier as a DC amplifier to amplify the ACC signal to a level suitable for rendering the second chrominance amplifier operative during color reception and inoperative during monochrome reception. The amplified ACC signal at the anode circuit of the first chrominance amplifier is coupled by a voltage divider network to the control grid of the second chrominance amplifier, which is biased heavily negative to disable that stage except during color reception when the amplified ACC signal is sufficient to overcome the negative bias. A diode connected from the control grid to ground prevents the grid from becoming positively biased. Utilizing the first chrominance amplifier as a DC amplifier in this manner eliminates the need for a separate color-killer voltage amplifier.

Figure 1:
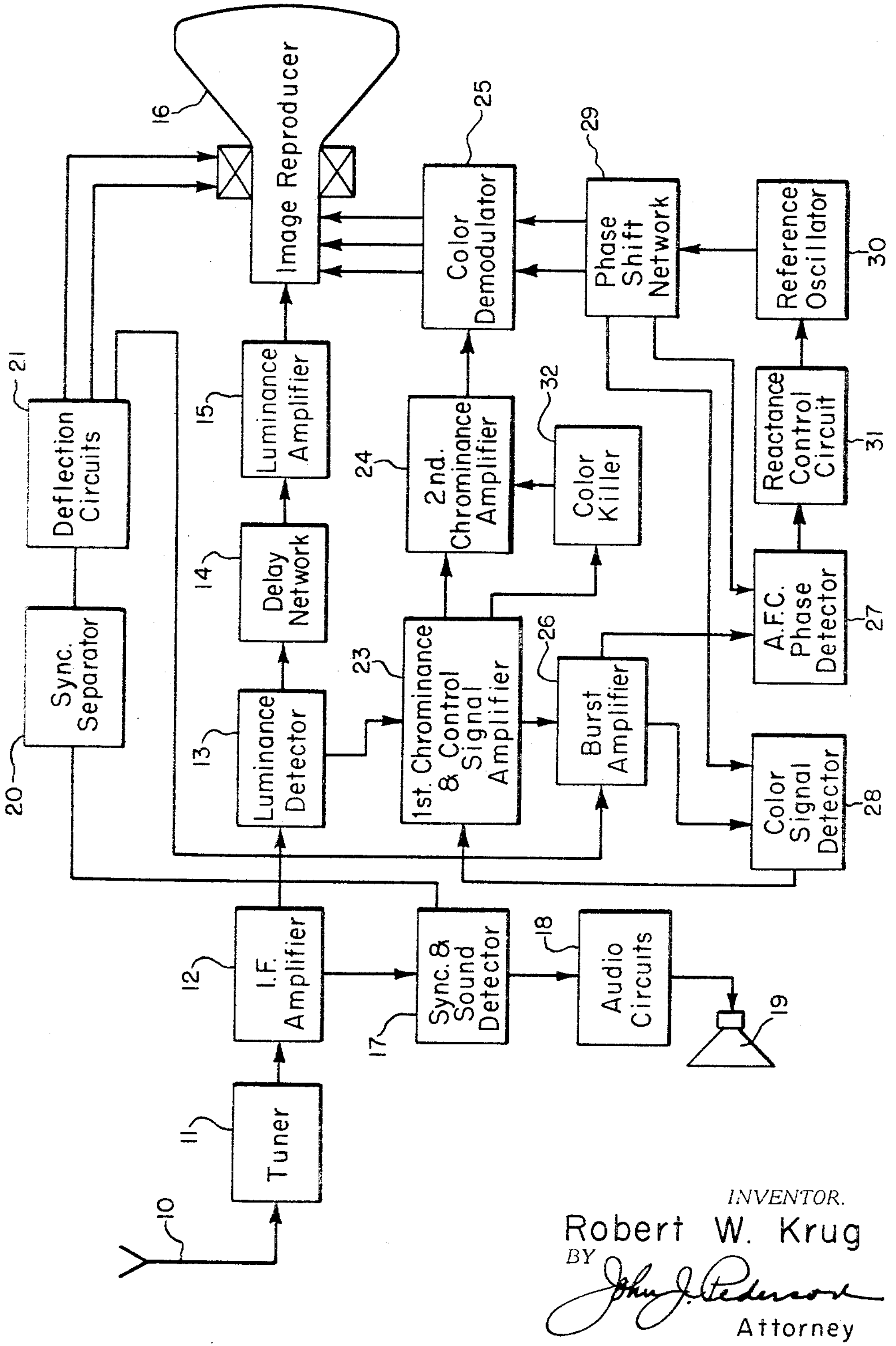

The present invention relates to improvements in color television receiving systems and more particularly to an improved circuit for automatically controlling the chrominance channel in a color television receiver.

In accordance with present United States standards governing color and monochrome television transmissions, the transmitted color television signal is compatible with and very similar in character to the standard monochrome television signal. In fact, the transmitted color television signal may be said to be a standard monochrome television signal to which a color-modulated subcarrier component and a synchronizing reference burst component have been added. The color subcarrier component is synchronously modulated to communicate color hue and saturation information relating to luminance information conveyed by the standard monochrome signal. The color synchronizing burst component, present only during color transmissions, is transmitted at fixed intervals to afford means for reconstructing at the receiver a subcarrier signal by which synchronous demodulation of the color carrier may be carried out. Color television receivers generally employ a separate translating network, or chrominance channel, for processing the color subcarrier and reference burst signals.

It has often been found desirable to incorporate in the home color television receiver a chrominance control circuit which disables or "kills" the color function during reception of standard monochrome television signals to prevent spurious color effects in the reproduced image. Many color television receiver designs provide means for sensing the presence or absence of the color burst component in a received color television signal, and if the burst component is present, automatically condition the receiver for proper demodulation of the color subcarrier and reproduction of the transmitted color television image. Absence of a burst signal indicates that a monochrome transmission is being received and the color function or chrominance channel of the receiver is automatically disabled to prevent noise disturbances from being visibly accentuated by varied color reproduction. Prior art arrangements have generally conditioned the switch from color to monochrome operation on the reduction of the received burst component below a predetermined level. It is also advantageous that the chrominance circuit "kill" the chrominance channel whenever the local oscillator which develops the reference signals utilized for synchronous detection of the color carrier signal is not operating in synchronism with the color burst, since under these conditions entirely erroneous and highly disturbing color effects may occur in the reproduced image. To be completely effective, the disabling or "killer" action in response to either of the above conditions should be virtually instantaneous; that is, the transition time from color to monochrome operation should be as small as possible. More importantly, the color-killer circuit should operate in a completely unambiguous manner; that is, it should function to either disable the chrominance channel of the receiver completely or to translate the full color carrier signal with no intermediate operational conditions being possible.

Besides disabling the chrominance channel during monochrome reception and non-synchronous operation of the local reference oscillator, it is desirable that the chrominance control circuit compensate for amplitude variations in the received chrominance signals. This is generally done by developing a control signal related to the amplitude of the received reference burst, and utilizing this control signal for adjusting the chrominance channel gain to maintain the reference burst amplitude constant.

A prime consideration in the design of chrominance control systems for mass-produced consumer television receivers is cost. It is desirable that a proposed system efficiently accomplish the aforementioned functions; i.e. automatic color-killing and chrominance level control, with a minimum number of additional components. Although numerous chrominance channel control systems have been proposed which effectively de-energize the receiver color function in the absence of color synchronizing signals and/or operating conditions where the color reference oscillator is not properly synchronized, these known systems have used a separate voltage amplifier stage, distinct from the chrominance channel, for generating the necessary "killer" control potential. This use of a separate amplifier stage is costly, and has added unnecessarily to the cost of the completed reeciver.

It is an object of the invention, therefore, to provide a new and improved chrominance channel control system for a color television receiver which acts to maintain the level of a received chrominance signal constant and which automatically disables the chrominance channel whenever color-synchronizing signals are not being received.

It is a more specific object of the invention to provide a new and improved chrominance channel control system requiring a minimum of additional components for maintaining the amplitude of a received signal constant and for disabling the chrominance channel under conditions unsatisfactory for acceptable color reception.

It is another object of the invention to provide a new and improved atuomatic control system for controlling the chrominance channel of a color television receiver with a minimum of added expense and circuit complexity.

It is still another object of the invention to provide a new and improved chrominance channel control system for disabling the chrominance channel under unsatisfactory color receiving conditions with a minimum of added cost.

In accordance with the invention, an automatic control system for use in the chrominance channel of a color television receiver adapted to receive monochrome and color composite signal transmissions includes receiving, translating and detecting circuits for deriving chrominance information signals, including color-modulated subcarrier and reference burst signals, from composite signal transmissions. The system includes a chrominance amplifier which is gain-dependent on an impressed control effect and adapted to amplify both the chrominance signal and the impressed control effect. A color signal detector circuit is utilized to generate a control effect which varies in amplitude in relation to the amplitude of the reference burst. Means are included for impressing this control effect on the chrominance amplifier for controlling its gain. A chrominance-signal translating network is coupled to the output of the chrominance amplifier, and means also coupled to the output of the chrominance amplifier utilize the amplified control effect therefrom to disable the chrominance-signal translating network when the reference burst falls below a predetermined level.

Figure 2:
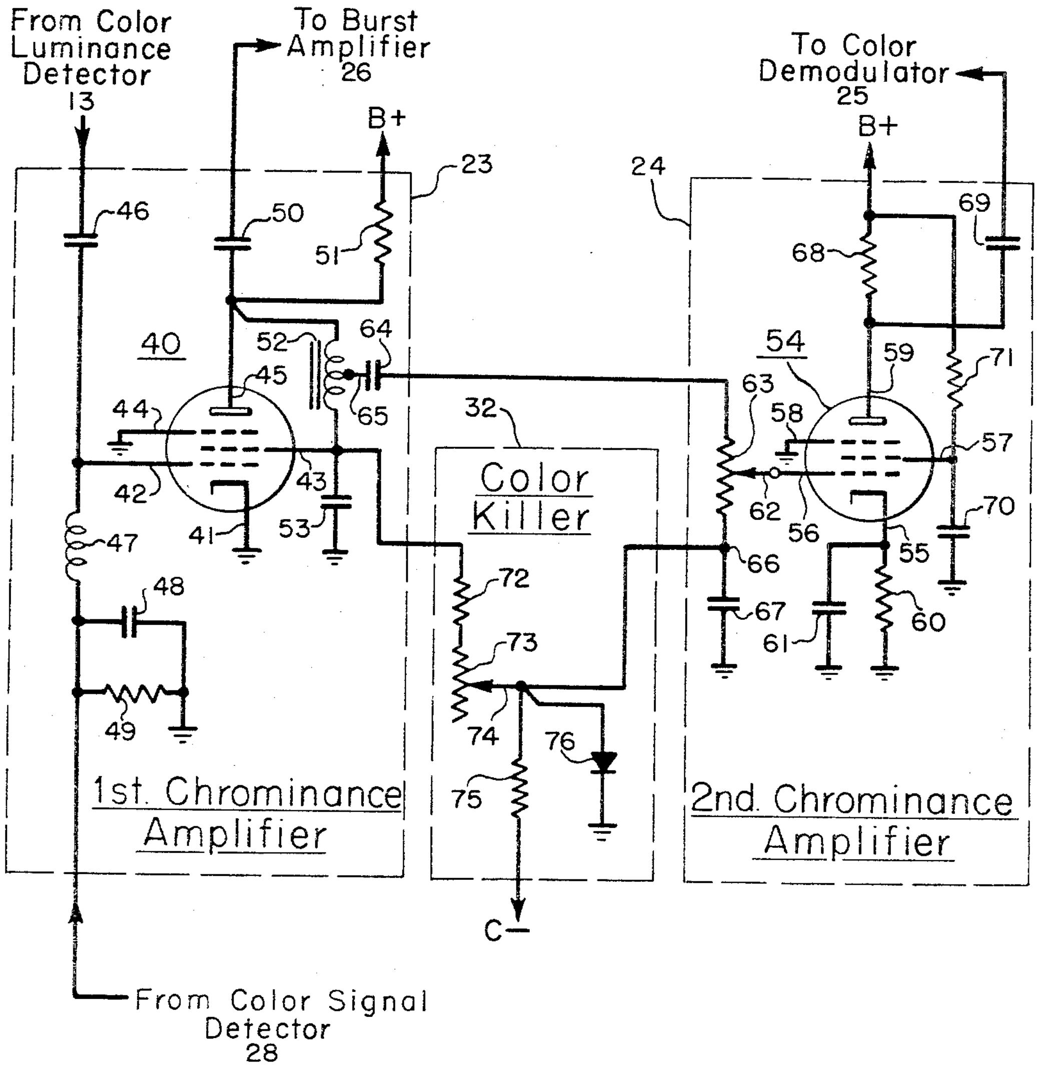

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

FIGURE 1 is a block diagram of a color television receiver which includes an automatic chrominance channel control system constructed in accordance with a preferred embodiment of the invention; and FIGURE 2 is a detailed schematic diagram of the chrominance amplifier and color killer circuitry of the receiver of FIGURE 1.

The color television receiver illustrated in FIGURE 1 comprises an antenna 10 coupled in a conventional manner to a tuner 11, which includes radio frequency amplifying and heterodyning stages. The intermediate-frequency output of tuner 11 is coupled to an intermediate-frequency amplifier 12 which, in turn, is coupled is a luminance detector 13. The video-frequency output of luminance detector 13 is coupled by a delay network 14 to a luminance amplifier 15. The amplified video-signal output from luminance amplifier 15 is applied to an image reproducer 16, which in this case is a standard three-gun shadow-mask color cathode-ray tube. The output of intermediate-frequency amplifier 12 is further coupled to a sync and sound detector 17, which is coupled by conventional audio circuits 18 to a speaker 19. The output of detector 17 is also coupled to a sync separator 20, the synchronizing signals from which are coupled to conventional receiver deflection circuits 21. The deflection circuits 21 are coupled to the deflection system of image reproducer 16.

Luminance detector 13 is further coupled to a chrominance channel comprising a first chrominance amplifier 23 and a chrominance-signal translating network, in this case a second chrominance amplifier 24. Second chrominance amplifier 24 is coupled to a color demodulator 25, which may comprise any of the suitable known types of synchronous detectors capable of demodulating the color-modulated subcarrier included in standard color telecasts. The demodulated output of color demodulator 25 is coupled to image reproducer 16. The output of first chrominance amplifier 23 is also coupled to a burst amplifier 26, which is gated on only during the burst interval by a signal derived from the deflection circuits 21. The amplifier reference burst signal from burst amplifier 26 is coupled to a phase detector 27 and to a color signal detector 28. Phase detector 27, color signal detector 28 and demodulator 25 are also coupled by a phase shift network 29 to a reference oscillator 30. An error voltage related to the relative phase of the two input signals to phase detector 27 is coupled from phase detector 27 to a reactance control circuit 31, which in turn is coupled to reference oscillator 30. Color signal detector 28 compares the burst signal from amplifier 26 with the signal from phase shift network 29 to generate a control effect, or chrominance channel control signal, which is coupled to first chrominance amplifier 23.

As thus described, the color television receiver circuit of FIGURE 1 is quite conventional, and accordingly only a brief description of its operation need be given here. A received signal is intercepted by antenna 10 and amplified and translated to an intermediate-frequency by tuner 11. Intermediate-frequency amplifier 12 amplified this signal, after which it is applied to both luminance detector 13 and sync and sound detector 17. The detected video signal from luminance detector 13, which represents the luminance components of a color telecast, is coupled by delay network 14 to luminance amplifier 15 and the amplified luminance signal from luminance amplifier 15 is applied to image reproducer 16. The detected output signal from sync and sound detector 17 is translated and amplified by conventional audio circuits 18 to drive speaker 19. Detector 17 is also coupled to a sync separator 20 which separates synchronizing information signals from the detected signal. This synchronizing information is utilized by conventional deflection circuits 21 to develop the usual horizontal and vertical sweep signals required by image reproducer 16.

A chrominance channel, comprising first and second chrominance amplifiers 23 and 24, couples chrominance signals from luminance detector 13 to color demodulator 25. These chrominance signals include color-modulated subcarrier and reference burst components, and the frequency response characteristic of the chrominance channel in such that only the portion of the received signal generally corresponding to these components is translated to color demodulator 25. Amplified chrominance signals from first chrominance amplifier 23 are applied to burst amplifier 26, which is gated on by pulses from the deflection circuits 21 so as to be operative only during the intervals in which reference burst signals are received. The amplified reference burst signals from burst amplifier 26 are compared in phase and frequency with the reference signal from reference oscillator 30 in phase detector 27, and an error voltage is generated corresponding to any phase error. This error voltage is applied to reactance control circuit 31, which acts on the color reference oscillator to overcome the phase error. A signal from reference oscillator 30, which is locked in phase and frequency to the reference burst in the manner just described, is supplied in proper phase to color demodulator 25 to permit synchronous detection of the color subcarrier signal. Color difference output signals from demodulator 25 are applied to image reproducer 16, wherein they are combined with the luminance signal from luminance amplifier 15 to reproduce images having proper luminance and chrominance characteristics.

The output of burst amplifier 26 is also coupled to color signal detector 28, wherein it is compared with a signal derived from reference oscillator 30 to generate a chrominance channel control signal. The magnitude of this control signal depends both on the relative amplitude of the received burst signal from burst amplifier 26 and on the relative phase between the oscillator 30 reference signal and this burst signal. As the reference burst increases in amplitude the control signal increases in negative potential, and when no burst is present, as during monochrome reception, the signal is reduced to zero. In practice, the control voltage is approximately −6 volts during normal color reception and −0.6 volt during monochrome reception. A wide discreptancy in phase or lack of synchronism between the reference and burst signals reduces the control voltage to zero, thus generating a control effect identical to that obtained during monochrome reception. The control signal generated by color signal detector 28 is impressed on first chrominance amplifier 23 and, by varying the gain of this stage in response to variations in the received reference burst level, maintains a constant chrominance signal level in the chrominance channel. In accordance with the invention, first chrominance amplifier 23 also acts as a voltage amplifier for the control signal, and the amplifier control signal therefrom is later used in conjunction with a color-killer circuit to disable the chrominance channel in a manner to be described.

The color television receiver of FIGURE 1 includes a novel color-killer circuit 32 as part of a chrominance channel control system constructed in accordance with the invention. Color-killer 32 is coupled to the output of first chrominance amplifier 23, and translates amplified control signals therefrom to generate a control signal which is coupled to second chrominance amplifier 24.

It will be recalled that first chrominance amplifier 23, in addition to amplifying the chrominance signal, amplifies the impressed chrominance channel control signal from color signal detector 28. Accordingly, minor control signal variations impressed on chrominance amplifier 23 appear as much greater voltage variations at the output of chrominance amplifier 23. As the impressed control signal varies from −0.6 volt to −6 volts, the output potential of first chrominance amplifier typically varies from 90 volts to 225 volts. Color-killer circuit 32 is preferably composed of a passive voltage divider network which couples the DC output voltage from chrominance amplifier 23 to a negative source, in practice approximately negative 75 volts. A movable tap on this network is so positioned as to vary its output voltage from −30 volts when the output voltage from first chrominance amplifier 23 is low (i.e., for monochrome reception) to +30 volts when the chrominance amplifier output voltage is high, as would be the case during normal color reception with a −6 volt control signal generated by color signal detector 28. A diode is connected to this tap, having its anode connected to the tap and its cathode connected to ground for preventing the tap from assuming a positive potential with respect to ground.

As in a conventional color television receiver, second chrominance amplifier 24 includes an active amplifying device, in this case an electron-discharge device, having a control electrode capable of maintaining the device in conductive and non-conductive states. The voltage divider tap is so coupled to this control electrode as to bias the electron-discharge device into a non-conductive state when the control signal applied to first chrominance amplifier 23 falls below a predetermined level. In practice, second chrominance amplifier 24 is switched to a non-conductive state as the control voltage shifts between approximately −4 volts and −3 volts. Because of the large DC amplification provided to this incremental change of control voltage by first chrominance amplifier 23, the "killing" action is essential unambiguous.

With a synchronous color signal detector of the type previously described, color-killer stage 32 renders second chrominance amplifier 24 operative only when the color synchronizing reference burst signal is present and bears a predetermined frequency and phase relationship to the color reference signal. Consequently, during monochrome telecasts or when the reference oscillator is not operating in synchronism with the received reference bursts, the chrominance channel is effectively disabled and only the conventional video channel provided by luminance detector 13, delay network 14 and luminance amplifier 15 controls image reproducer 16.

FIGURE 2 comprises a detailed schematic diagram of a preferred color-killer circuit incorporated in a chrominance channel control system constructed in accordance with the invention. First chrominance amplifier 23 comprises an amplifying device, in this case an electron-discharge device 40 having a cathode electrode 41, a control electrode 42, a screen electrode 43, a suppressor electrode 44, and an anode electrode 45. Cathode electrode 41 is grounded and a capacitor 46 couples the output of luminance detector 13 to control electrode 42. Another circuit serially including an inductance 47 couples the chrominance channel control signal from color signal detector 28 to control electrode 42. A capacitor 48 and a resistor 49 are parallel-connected from the output of color signal detector 28 to ground. Anode electrode 45 is coupled by a capacitor 50 to the input of burst amplifier 26 and by a plate resistor 51 to a positive potential source B+. A tuned plate inductance 52 connects anode electrode 45 to screen electrode 43, which is by-passed to ground by a capacitor 53. Suppressor electrode 44 is grounded.

Second chrominance amplifier 24 likewise comprises an electron-discharge device 54, which includes a cathode electrode 55, a control electrode 56, a screen electrode 57, a suppressor electrode 58 and an anode electrode 59. The cathode electrode 55 of electron-discharge device 54 is connected to ground by a parallel circuit comprising a cathode resistor 60 and a cathode by-pass capacitor 61. Control electrode 56 is connected to an arm 62 of a potentiometer 63, one terminal of which is coupled by a capacitor 64 to a tap 65 on tuned plate inductance 52. The other terminal of potentiometer 63 is connected to a juncture 66, which is by-passed to ground by a capacitor 67. Anode electrode 59 is connected by a plate resistor 68 to a position potential source and is also coupled by a capacitor 69 to the input of color demodulator 25. Screen electrode 57 is by-passed to ground by a capacitor 70 and is connected by a screen-dropping resistor 71 to a positive potential source. Suppressor electrode 58 is grounded.

In operation, a chrominance signal from detector 13 is coupled by capacitor 46 to control electrode 42 of electron-discharge device 40. After amplification by device 40, the signal appears across tuned inductance 52 and is coupled by capacitor 64 to potentiometer 63, and by capacitor 50 to burst amplifier 26. Arm 62 couples a portion of the signal appearing across potentiometer 63 to control electrode 56 of electron-discharge device 54. After amplification by device 54, the signal is coupled by capacitor 69 to color demodulator 25. Resistor 60 provides cathode biased in a conventional manner to electron-discharge device 54, and capacitor 61 serves as a cathode by-pass capacitor. A chrominance channel control signal from color signal detector 28 is impressed on control electrode 42 through inductance 47, which offers a high impedance to ground to the chrominance signal appearing on that electrode. This impressed control signal varies the gain of electron-discharge device 40 in a well-known manner, and as previously outlined, the end result of this action is that the chrominance signal appearing at the output of first chrominance amplifier 23 is held essentially constant under varying reception conditions. The combination of resistor 49 and capacitor 48 form a time-constant network which determines the response time of the first chrominance amplifier to changing chrominance channel control signals.

The color-killer circuit 32 comprises a voltage divider network connected between screen electrode 43 and a negative potential source C−, This network serially includes a resistor 72, a potentiometer 73, an arm 74 on that potentiometer, and a resistor 75. Arm 74 is connected to junction 66 and to the anode electrode of a diode device 76, the cathode electrode of which is grounded.

Electron-discharge 40, in addition to providing AC amplification to the chrominance signal, provides DC amplification of the control signal impressed on control electrode 42. It will be recalled that as the control signal varied from −0.6 volt to −6 volts, the amplified control signal varied from 90 volts to 225 volts. This variation appears at anode electrode 45, which is coupled by the voltage divider network to a negative potential source, in this case, approximately −75 volts. Potentiometer arm 74 is positioned so that its potential, and consequently the potential on control electrode 56, varies from −30 volts to +30 volts as the screen electrode varies from 90 volts to 225 volts. In actuality, control electrode 56 never assumes a positive potential with respect to ground because of the clamping action of diode 76.

During unfavorable conditions for color reception, control electrode 56 is biased at —30 volts, and electron-discharge device 54 is held in a non-conductive or cut-off state so that no chrominance signal is applied to color demodulator 25. Under favorable conditions control electrode 56 is biased at zero volt as a result of the clamping action of diode 76, and electron-discharge device 54 operates normally to supply a signal to color demodulator 25. Although this particular embodiment of the invention makes use of electron-discharge devices as amplifying elements, the invention may also be used with chrominance channel circuitry employing semi-conductor amplifying devices.

The color-killer circuit shown in FIGURE 2 is preferable to prior art arrangements because of its improved performance and relative economy. This circuit, unlike previous designs, requires no separate vacuum tube color-killer voltage amplifier, but rather makes use of a stage already present in the chrominance channel of the receiver to achieve the necessary control voltage amplification. All that is added is a simple voltage divider network and a single clamping diode, and by making one tube serve two purposes, a significant savings in cost and power consumption is realized. With the present large scale mass-production of consumer color television receivers and the trend toward reduced selling prices for these sets, this savings in cost is of great importance. And furthermore, when this color-killer circuit is used in conjunction with chrominance channel control systems constructed in accordance with the invention, performance is equal to or better than previous color-killer circuit designs.

While particular embodiments of the invention have been shown and described, it will be obvious to those skilled in the art that changes and modifications may be made without departing from the invention in its broader aspects, and, therefore, the aim of the appended claims is to cover all such changes and modifications as fall within the true spirit and scope of the invention.

I claim:

1. An automatic control system for use in the chrominance channel of a color television receiver adapted to receive monochrome and color composite signal transmissions, said system comprising:

receiving, translating and detecting circuits for deriving chrominance information signals including color-modulated subcarrier and reference burst signals from said composite signal transmissions;

a chrominance amplifier gain-dependent on an impressed control effect and adapted to amplify said chrominance signals and further adapted to amplify said impressed control effect;

a color signal detector circuit for generating a control effect which varies in amplitude in relation to the amplitude of said reference burst;

means for impressing said control effect on said chrominance amplifier for controlling its gain;

a chrominance-signal translating network coupled to the output of said chrominance amplifier; and means coupled to the output of said chrominance amplifier for utilizing the amplified control effect therefrom to disable said chrominance translating network when said reference burst falls below a predetermined level.

2. An automatic control system, operable from positive and negative unidirectional current sources, for use in the chrominance channel of a color television receiver adapted to receive monochrome and color composite signal transmissions, said system comprising:

receiving, translating and detecting circuits for deriving chrominance information signals including color modulated subcarrier and reference burst signals from said composite signal transmissions;

a first chrominance amplifier circuit gain-dependent on an impressed control potential and having input and output circuits, said amplifier being adapted to amplify said color subcarrier and reference burst signals and further adapted to amplify said impressed control potential;

a color signal detector coupled to one of said circuits for generating a control potential varying in amplitude in relation to the amplitude of said reference burst;

means for impressing said control potential on said first chrominance amplifier for controlling its gain to compensate for variations in the amplitude of said reference burst;

a chrominance-signal translating network coupled to the output circuit of said first chrominance amplifier; and a passive color-killer circuit coupled to the output circuit of said first chrominance amplifier for utilizing the amplified control potential therefrom to disable said chrominance-signal translating network when said reference burst falls below a predetermined level.

3. A control system as recited in claim 2 in which said chrominance-signal translating network comprises a second chrominance amplifier adapted to further amplify said color-modulated subcarrier signal.

4. A control system as recited in claim 2, in which said color detector is coupled to the output of said first chrominance amplifier circuit.

5. A control system as recited in claim 4, in which a burst amplifier stage is interposed between first chrominance amplifier and said color signal detector circuit to derive and amplify said reference burst signals apart from said chrominance information signal.

6. A control system as recited in claim 2, in which:

said chrominance-signal translating network includes an amplifier device having conductive and non-conductive operating states and further having a control electrode for determining the operating state of such amplifier device; and in which said passive color-killer circuit comprises a voltage-divider network coupling said first chrominance amplifier output circuit to said negative current source, said network having a movable output tap connected to said control electrode for rendering said amplifier device non-conductive when said reference burst falls below a predetermined level.

7. A control system as recited in claim 6 in which said color detector is coupled to the output of said first chrominance amplifier circuit.

8. A control system as recited in claim 6, in which said amplifier device includes a cathode, and in which said passive color-killer circuit includes clamping means for preventing said control electrode from assuming a positive potential with respect to said cathode.

9. A control system as recited in claim 8, in which said clamping means comprises a diode having an anode coupled to said control electrode and a cathode coupled to said amplifier device cathode.

References Cited

UNITED STATES PATENTS

| | | | |
|---|---|---|---|
| 2,894,061 | 7/1959 | Oakley et al. | |
| 3,346,691 | 10/1967 | Tschannen | 178—5.4 |

ROBERT L. GRIFFIN, *Primary Examiner.*

RICHARD MURRAY, *Assistant Examiner.*